Jan. 17, 1961 J. S. JARVIS 2,968,516
PACKING RINGS FOR USE ON DOUBLE ACTING PISTONS
Filed Nov. 16, 1959
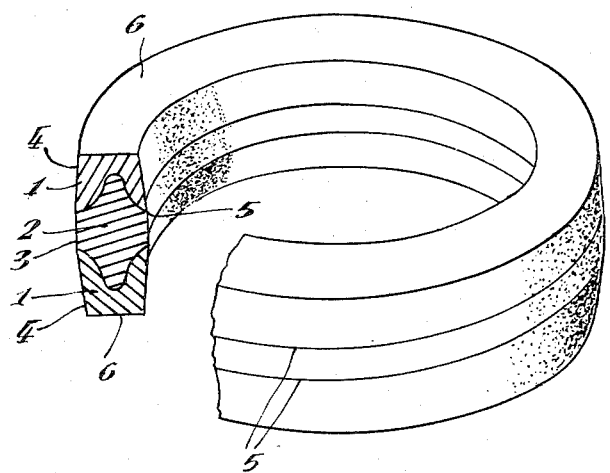
Inventor
Jack Stanley Jarvis
by Albert Jacobs
Attorney

United States Patent Office 2,968,516
Patented Jan. 17, 1961

2,968,516

PACKING RINGS FOR USE ON DOUBLE ACTING PISTONS

Jack Stanley Jarvis, Hampton, England, assignor to Hall & Hall Limited, Hampton, England Filed Nov. 16, 1959, Ser. No. 853,100

Claims priority, application Great Britain July 22, 1959

3 Claims. (Cl. 309—23)

This invention relates to packing rings and in particular to packing rings of the kind adapted to be expanded against sealing surfaces to provide a seal and suitable for use with reciprocating shafts.

A packing ring of the kind described to which the invention relates having a U section is to be distinguished from a "block" ring which is reinforced on the working face only and relies on the pressure of the backing ring face opposite the working face against the stuffing box to press the wear resisting reinforced working face against the moving part.

Packing rings of the kind described are known in which the side walls or wings are adapted to be expanded by fluid pressure in the channel formed therebetween. Such rings are referred to hereafter as channel packing rings. It is known to use spring actuated expanding means with such channel packing rings disposed in said channel so as to hold the wings of the U expanded when there is no fluid pressure or when the fluid pressure is insufficient to maintain the seal. Furthermore, it is known to use with such channel packing rings a filling ring of semi-circular or V shaped cross section disposed in the same stuffing box so that when the parts are assembled the two rings are pressed together with the convex semi-circular periphery or the point of the V entering between and expanding the wings.

In the case of such channel packing rings there is a tendency for wear to take place particularly at the heel due to fluid pressure distorting the ring. There is also a tendency for the wings to collapse inwardly after being used for a while and this is not entirely cured by the fitting of a ring into the channel neither does such a ring provide any substantial assistance in preventing excess wear at the heel as fluid can enter between the two members and holes are frequently provided in the ring of semi-circular cross section to facilitate such entry and permit the fluid pressure to expand the channel.

One of the objects of the present invention is to provide an improved packing ring which will overcome some or all the above disadvantages.

A packing ring of unit construction according to the present invention comprises three annular members of rubber or rubberlike material formed in one with each other or bonded together throughout their contacting surfaces and consisting of two annular outer body members of channel shaped cross-section in axially opposed relationship, with the lips thereof directed towards each other, and an annular filling member disposed between said channel members, said filling member being formed of a more readily deformable material than said channel members, and occupying the whole of the space between and enclosed by the side walls of the two channel members. The side walls may be reinforced, for example with fabric to provide increased stiffness and give greater wearing properties.

Referring to the drawing filed herewith which shows a partly sectioned perspective view of one form of packing ring made according to the present invention. In the form shown in the drawing, the channel shaped rings 1 are formed of a plurality of layers of fabric impregnated with artificial rubber known under the registered trademark "Hallprene" and are filled at 2 with a ring also of "Hallprene" and the whole cured in a mould, the filling 2 having substantially flat exposed surfaces 3 in cross section which merge with the outer edges 5 of the straight and slightly diverging walls 4 of the channel shaped rings 1 which present flat outer surfaces 6.

In use the flat surfaces 6 are exposed to fluid pressure whilst the edges 5 and the walls 4 are in contact on the one side with the cylinder and on the other side engaged with the piston.

The fluid pressure tends to compress the filling 2 which being resilient is subject to cold flow which increases the pressure of the walls 4 in direct relation to the fluid pressure. The walls 4 being moulded with slightly divergent walls and because the filling 2 is resilient the walls of the packing ring will not tend to collapse and once put under pressure will maintain a pressure and retain a seal even though the fluid pressure falls to zero.

With a packing ring constructed as above described the edges 5 of the channel shaped rings are protected against damage by being merged with the filling member 2.

The invention provides a packing ring which obviates the disadvantage hitherto arising of oil being trapped between two seals of the conventional type and as a result the life of the ring according to the invention is considerably increased.

What I claim and desire to secure by Letters Patent is:

1. A packing ring of unit construction formed of rubber-like material and consisting of two annular outer body members of channel cross-section each providing a flat pressure face subjectable to fluid pressure and two outwardly divergent side walls, said body members being axially opposed with their side wall edges directed towards each other and an annular filling member, formed of a more readily deformable material than said body members, disposed between said body members and occupying the whole of the space between and bounded by the side walls of the two body members, the whole being bonded together to form the unit construction.

2. A packing ring according to claim 1 wherein the side walls of the body members are reinforced with fabric to provide increased stiffness and give greater wearing properties.

3. A packing ring as claimed in claim 1 wherein the body members are formed of a plurality of layers of fabric impregnated with artificial rubber, the filling member having substantially flat exposed surfaces in cross section which merge with the edges of the walls of the body members.

References Cited in the file of this patent

UNITED STATES PATENTS 2,847,262    Gratzmuller _____ Aug. 12, 1958

FOREIGN PATENTS 639,652    Great Britain _____ June 14, 1950